(12) United States Patent
Chapman et al.

(10) Patent No.: US 6,177,735 B1
(45) Date of Patent: Jan. 23, 2001

(54) INTEGRATED ROTOR-GENERATOR

(76) Inventors: Jamie C. Chapman, 15 Sleeper St., #402, Boston, MA (US) 02210-1225; Jon A. Peterka, 733 Duke Sq., Ft. Collins, CO (US) 80525

( * ) Notice: Under 35 U.S.C. 154(b), the term of this patent shall be extended for 0 days.

(21) Appl. No.: 08/961,048

(22) Filed: Oct. 30, 1997

Related U.S. Application Data (60) Provisional application No. 60/029,387, filed on Oct. 30, 1996.

(51) Int. Cl.[7] .................................. F03D 9/00; H02D 9/04
(52) U.S. Cl. ................................. 290/44; 290/52; 290/53; 290/54; 290/55
(58) Field of Search .................................. 290/52, 53, 54, 290/55; 417/356, 365

(56) References Cited

U.S. PATENT DOCUMENTS

| | | | |
|---|---|---|---|
| 4,064,403 | * 12/1977 | Miller | 290/52 |
| 4,134,707 | * 1/1979 | Ewwers | 415/4 |
| 4,220,870 | * 9/1980 | Kelly | 290/44 |
| 4,494,007 | * 1/1985 | Gaston | 290/44 |
| 4,616,298 | * 10/1986 | Bolson | 362/192 |
| 4,831,297 | * 5/1989 | Taylor et al. | 310/87 |
| 5,083,040 | * 1/1992 | Whitford et al. | 290/52 |
| 5,209,650 | * 5/1993 | Lemieux | 417/356 |
| 5,289,042 | * 2/1994 | Lis | 290/55 |
| 5,506,453 | * 4/1996 | McCombs | 290/44 |
| 5,591,004 | * 1/1997 | Aylor | 416/42 |
| 5,696,419 | * 12/1997 | Rakestraw et al. | 310/268 |

* cited by examiner

Primary Examiner—Elvin Enad
(74) Attorney, Agent, or Firm—Kolisch Hartwell Dickinson McCormack & Heuser (57) ABSTRACT

A system and method for interconverting moving fluid power and electrical power involves an aerodynamic rotor integrated with an electric rotor without an interconnecting rotating shaft.

22 Claims, 9 Drawing Sheets

CLOSED

OPEN

Fig. 25

INTEGRATED ROTOR-GENERATOR

Cross-Reference to Related Application

This application claims priority from U.S. provisional patent application Serial No. 60/029,387, filed Oct. 30, 1996 of inventor Jamie Chapman entitled INTEGRATED ROTOR-GENERATOR FOR THE PRIME WIND TURBINE, the content of which is hereby incorporated by reference.

BACKGROUND

FIGS. 1–4, inclusive, illustrate prior art systems.

Figure 1:
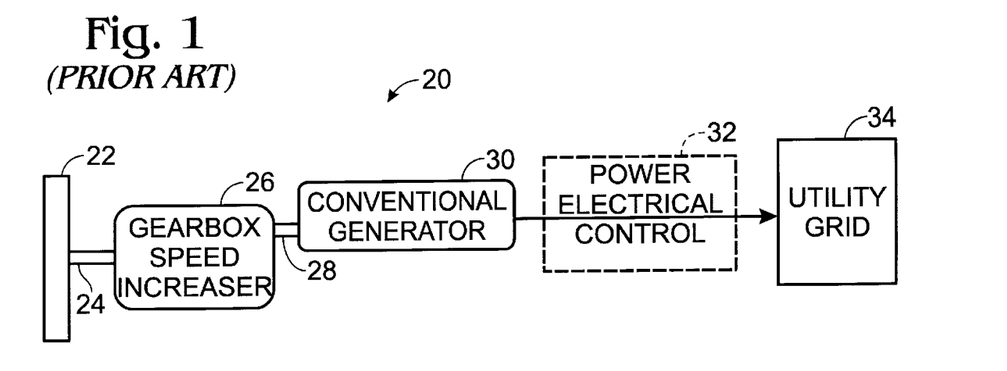
FIG. 1 is a schematic diagram illustrating components of a conventional wind turbine.

FIG. 1 is a schematic illustration of a typical power conversion system 20. Aerodynamic rotor 22 is connected via rotating shaft 24 to speed increaser gear box 26. Aerodynamic rotor 22 typically operates at a rotational speed in the range of 20 to 300 rpms. Gear box 26 translates the rotational speed of shaft 24 into a relatively higher rotational speed of shaft 28, which in turn is connected to conventional generator 30. Power electronic control 32 is sometimes used to control the generator and to convert the generator's variable-voltage, variable-frequency power to a standard utility voltage and frequency. Utility grid 34 receives and stores the generator electricity for use.

Figure 2:
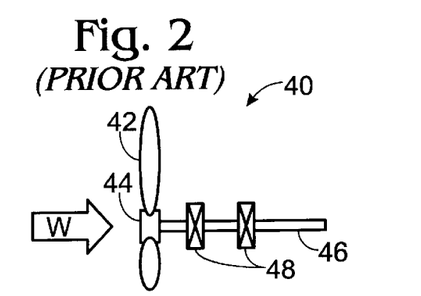
FIGS. 2 and 3 show side and front views, respectively, of a conventional propeller-type aerodynamic rotor.
Figure 3:
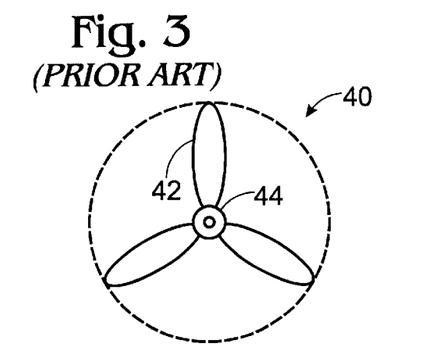

Aerodynamic rotor 22 is usually a propeller-type rotor, such as rotor 40 in FIGS. 2 and (3). A plural of blades 42 are connected to and extend radially out from central hub 44. Hub 44 is connected to a distal end of shaft 46 which rotates with hub 44 and blades 42 in response to wind W impinging on blades 42. FIG. 3 shows a front view of aerodynamic rotor 40 which optimally would receive wind from a direction normal to the plane of the figure.

There are two common types of speed increasers that are used in wind turbines, a gear box and a belt-and-pulley transmission. A speed increaser is required because there is a mismatch between the optimally-efficient operating speed of the aerodynamic rotor and the electric generator. The most efficient conversion speeds of most aerodynamic rotors are typically much lower than the optimally-efficient, rotational speeds of standard industrial electric machines such as squirrel-cage induction or synchronous generators. These machines are designed for relatively high-speed, low-torque operation. For example, the standard four-pole induction or synchronous machine operates at 60 Hz at a nominal speed of 1800 rpm. In contrast, depending on the power level of the aerodynamic rotor operating in air, the aerodynamic rotor may have an operating speed in the range of 20 rpm to 300 rpm. Depending on the wind speed regime, the 20 rpm speed may apply to rotors designed to deliver 600 kW to 1000 kW of shaft power. Similarly, the 300 rpm speed might apply to much smaller rotors designed to deliver 2 kW to 10 kW. Use of a speed increaser significantly increases the number of required parts, cost of manufacturing, complexity of ultimate design and potential for mechanical failure. Use of a speed increaser also results in a loss of power conversion efficiency.

Figure 4:
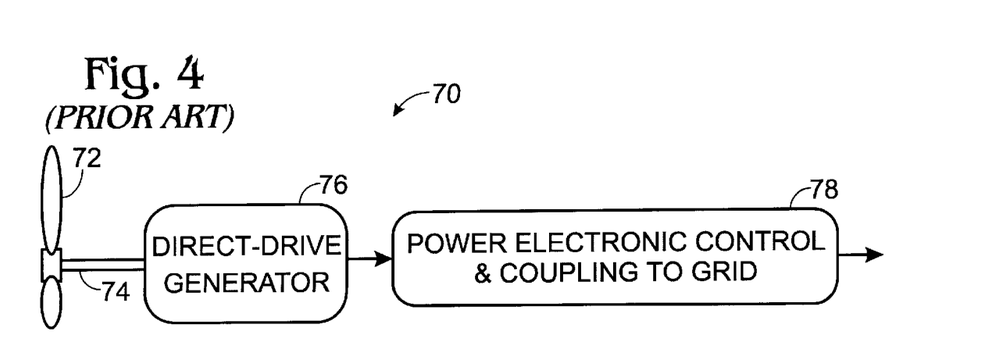
FIG. 4 is a schematic diagram of a conventional wind turbine employing a direct-drive generator.

Wind turbines have been manufactured which do not require speed increasers to translate shaft rotational speed between an aerodynamic rotor and a generator. Such systems are referred to as "direct-drive wind turbines." For example, as shown in FIG. 4, power conversion system 70 employs a propeller-type aerodynamic rotor 72 connected via rotary shaft 74 to direct drive generator 76. Shaft 74 rotates with rotor 72. Shaft 74 is supported by bearings (not shown). The main shaft support bearings can be located on the shaft in a pillow-block arrangement or can be located within the gear box. Power conversion system 70 is a variable-speed configuration which employs power electronic control 78 to control the generator and to convert the generator's variable-voltage, variable-frequency power to a standard utility voltage and frequency.

An object of the invention is to provide a simple, manufacturable and efficient system for interconverting moving fluid power and electrical power.

A more specific object of the invention is to efficiently convert fluctuating wind power into electricity.

Another object of the invention is to provide a wind turbine which does not require a speed-increaser to couple the torque and power from an aerodynamic rotor to an electric machine.

Still another object of the invention is to employ a shaft and support bearing configuration for an aerodynamic rotor which eliminates the fluctuating bending moments which occur when a shaft is required to support and rotate with an aerodynamic rotor.

SUMMARY

DESCRIPTION OF THE INVENTION

Figure 5:
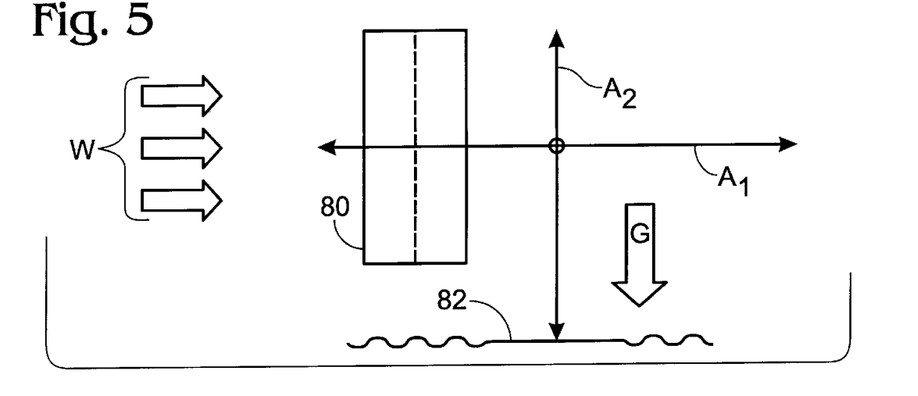
FIG. 5 is a schematic diagram of a wind turbine in accordance with the present invention, illustrated relative to axes which are used to describe various embodiments of the invention throughout the specification.

FIG. 5 illustrates some coordinates that are used to describe preferred embodiments of the invention and in the claims. Wind W is directed toward a front side of aerodynamic rotor 80, thereby causing rotor 80 to rotate around rotor axis A1. Rotor axis A1 will typically be substantially parallel to the ground 82 and should be in parallel with the wind direction W. Another important rotational axis A2 is generally parallel to gravitational direction G, perpendicular to ground 82, and perpendicular to rotor axis A1. Axis A2 may be referred to as a "wind-seeking axis" or a "primary support axis." Axis A2 is generally defined by the particular support structure which is employed to support rotor 80 and other components of the wind turbine system which may be oriented along or relative to axis A1. Depending on the direction of wind W, axis A1 is free to rotate around axis A2 so that the front face of rotor 80 is optimally positioned to receive wind W.

Figure 6:
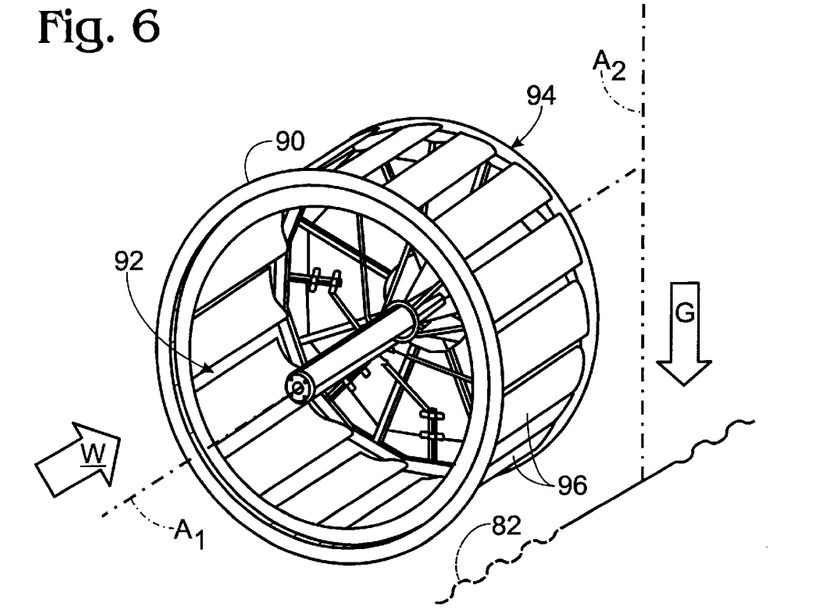
FIG. 6 is a perspective view of an integrated rotor-generator according to a preferred embodiment of the present invention.

FIG. 6 shows a perspective view of a hoop-shaped or squirrel cage aerodynamic rotor 90 relative to the coordinate system discussed above and shown in FIG. 5. Aerodynamic rotor 90 has an open front end 92 for receiving wind W, and a back end 94. Rotor 90 has a plurality of air foils 96 distributed around the periphery of the hoop-like structure. Wind W is received through open end 92 of rotor 90 and then is directed out through the periphery of rotor 90 between air foils 96, thereby imparting rotational movement of rotor 90 around rotary axis A1.

Other details and structures relating to the category of hoop-type rotors, such as rotor 90, are described in U.S. Pat. No. 4,781,523 issued on Nov. 1, 1988, U.S. Pat. No. 5,425,619 issued on Jun. 20, 1995, and U.S. Pat. No. 5,591,004 issued on Jan. 7, 1997, each of which names Elmo E. Aylor as the inventor, and each of which is hereby incorporated by reference.

Figure 7:
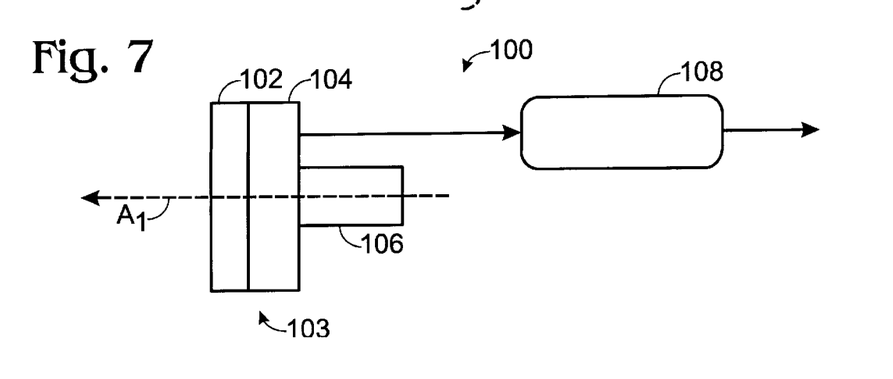
FIG. 7 is a schematic illustration of an integrated rotor-generator in accordance with the present invention.

A preferred embodiment of the invention is schematically illustrated in FIG. 7. Power conversion system 100 employs aerodynamic rotor 102 which is directly connected to and integrated with direct drive generator 104 so that an electric rotor (not shown) inside generator 104 turns along with aerodynamic rotor 102 around axis A1. which is inline with support shaft 106 Aerodynamic rotor 102 and the rotor contained in generator 104 are joined at regions which are referred to herein as being peripheral regions. There peripheral regions are generally pointed to in FIG. 7 at 103, and one will note that these regions are (or this region is) spaced from axis A1. Since rotor 102 and generator 104 are connected and integrated with each other, it is unnecessary for shaft 106 to rotate, thereby eliminating stress and fatigue problems which occur with rotating shafts in the prior art. The design illustrated in FIG. 7 also eliminates the requirement for using shaft 106 as a torsion transfer mechanism between aerodynamic rotor 102 and the electric rotor contained in direct drive generator 104. Generator 104 produces variable-voltage, variable-frequency power which is controlled and converted by controller 108 to a standard utility voltage and frequency.

In the embodiment of the invention pictured in FIG. 7, and in all modifications of the invention, connective joinder (integration) between the aerodynamic rotor and the generator rotor is made at (or very near) peripheral regions of these two structure—regions which circumsurround and are remote from the rotational axis, such as axis A1.

Figure 8A:
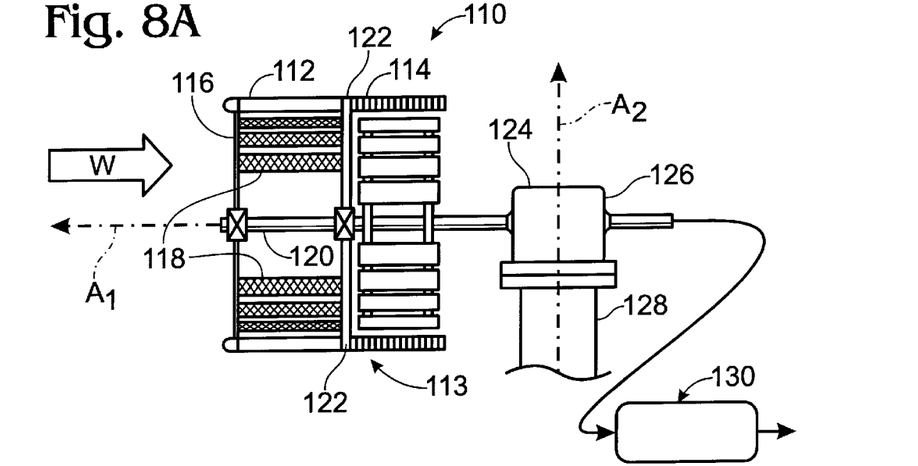
FIG. 8A is a side view of an integrated rotor-generator according to a preferred embodiment of the present invention.

FIG. 8A shows a preferred embodiment of an integrated rotor-generator. Integrated rotor-generator 110 includes a squirrel cage aerodynamic rotor portion 112 connected at peripheral region 113 to a direct-drive generator portion 114. Front end 116 of aerodynamic rotor portion 112 faces and receives oncoming wind W. Wind W is then directed out through the perimeter of aerodynamic rotor portion 112 between air foils 118, thereby imparting rotational motion to rotor 112 around rotary axis A1 which is inline with the core of shaft 120. Direct drive generator portion 114 includes an electric rotor which is directly connected to aerodynamic rotor 112 via links 122 located near the perimeter (peripheral region) of the assembly. This perimeter, or peripheral, region is seen to be spaced from axis A1. Use hereinafter of the word "perimeter" should be understood to be a use referring to peripheral regions in the particular structure or structures under discussion. Since aerodynamic rotor portion 112 and direct drive generator portion 114 are directly connected and integrated together in a single continuous cylindrical unit, it is unnecessary for shaft 120 to transfer torque between the two sub-units 112 and 114. Therefore, shaft 120 can remain stationary relative to axis A1, thereby eliminating the stress and fatigue problems which often occur with a rotating shaft that supports load and transfers torque between the aerodynamic rotor and the generator.

Figure 8B:
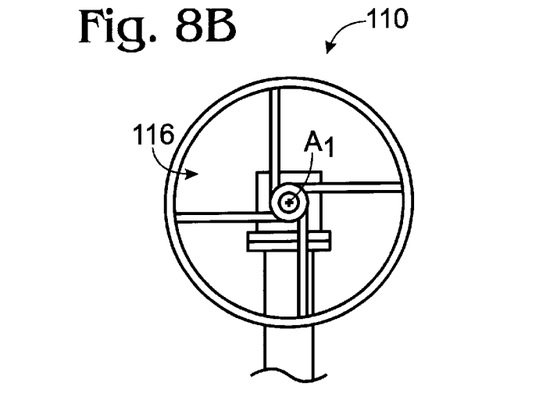
FIG. 8B shows a front view of the integrated rotor-generator shown in FIG. 8A.

FIG. 8A also shows a primary support structure 124 which defines wind-seeking or primary support axis A2 around which shaft 120 can rotate so that wind W is optimally directed into front end opening 116 of aerodynamic rotor portion 112. Primary support structure 124 has an upper portion 126 that turns around axis A2 along with shaft 120. Lower portion 128 of primary support structure 124 is connected with the ground (not shown) and remains stationary relative to axis A2. Electric power produced by generator portion 114 is then processed by power electronic control system 130, as described previously. It can be seen in FIG. 8A that the particular geometry, i.e., hoop-shaped shell structure, of a squirrel cage aerodynamic rotor, is particularly well-suited to integration with a direct drive generator which includes an electric rotor of complimentary shape and size. FIG. 8B shows a front view of integrated rotor-generator 110.

Figure 8C:
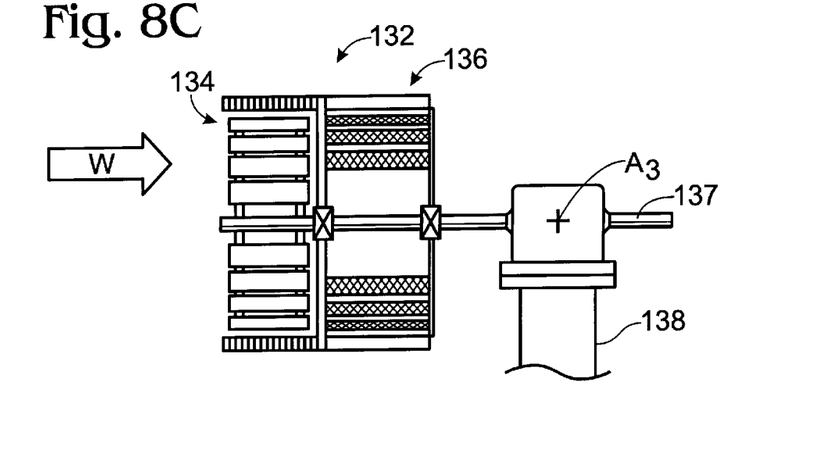
FIG. 8C shows a side view of an integrated rotor-generator in accordance with alternate embodiment of the present invention.

FIG. 8C shows an integrated rotor-generator which is the same as rotor-generator 110 of FIG. 8A, except that the relative positions of the aerodynamic rotor position and the generator portion are switched. Integrated rotor-generator 132 has an electric generator portion 134 in front. The back side of generator portion 134 is integrally connected to aerodynamic rotor portion 136. Both of generator portion 134 and aerodynamic rotor portion 136 are supported by stationary support shaft 137 which is held in an orientation generally parallel to the direction of wind W, by support structure 138.

Figure 9A:
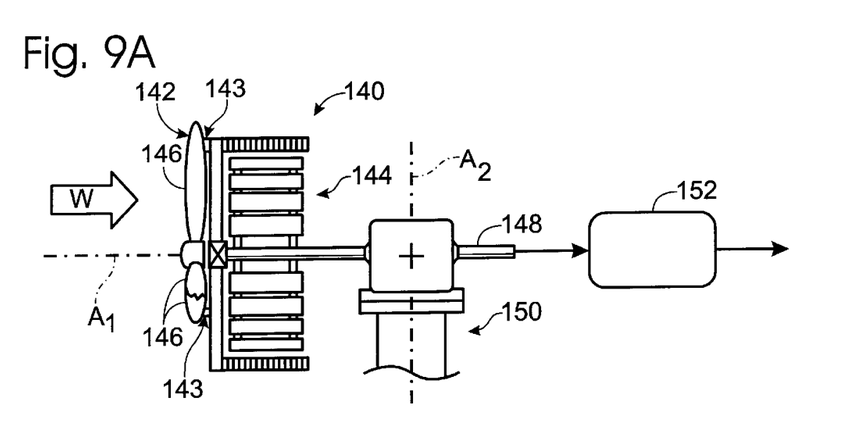
FIG. 9A shows a side view of another integrated rotor-generator employing a propeller-type aerodynamic rotor.
Figure 9B:
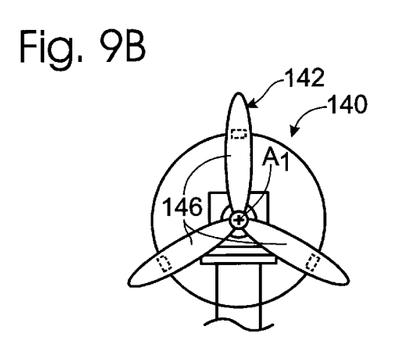
FIG. 9B shows a front view of the integrated rotor-generator shown in FIG. 9A.
Figure 9C:
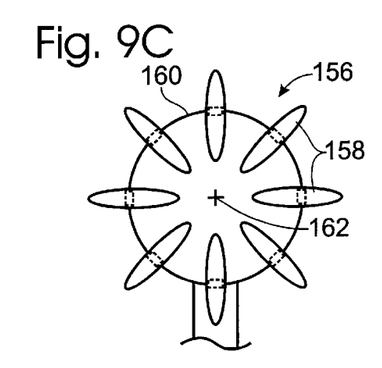
FIG. 9C is a front view of another integrated rotor-generator embodiment of the present invention.

FIGS. 9A and 9B are similar to FIGS. 8A and 8B except a propeller-type aerodynamic rotor is used instead of a squirrel cage-type rotor. FIG. 9A shows a side view of integrated rotor generator 140. Propeller-type aerodynamic rotor 142 is integrally connected at peripheral region 143 with an electric rotor in direct drive generator 144. Blades 146 on rotor 142 extend radially outward from a central hub and receive oncoming wind W, thereby imparting rotational movement of rotor 142 around rotary axis A1. Since aerodynamic rotor 142 is connected to the electric rotor in direct drive generator 144, the two rotors turn together as a single unit in response to oncoming wind. Shaft 148 functions to support integrated rotor-generator 140, but is not required to transfer torque or rotate relative to axis A1, thus eliminating stress and fatigue problems associated with rotating shafts. Primary support structure 150 allows integrated rotor-generator 140 to rotate about primary support axis A2 according to changes in wind direction W. As previously discussed, electric power produced by generator 144 is controlled and converted by controller 152 before delivery to a grid. FIG. 9B shows a front view of integrated rotor-generator 140. FIG. 9C shows another variation of an integrated rotor-generator.

Integrated rotor-generator 156 employs aerodynamic rotor blades 158 which extend in radial directions but are not connected to a central hub. Blades 158 are directly connected to electric rotor 160 for receiving and converting wind power into electric power. Electric rotor 160 rotates around axis 162. The embodiment illustrated in FIG. 9C demonstrates the lack of necessity for a rotating shaft in the present invention The result is that many different types of integrated rotor-generator designs are possible. Another way of thinking about the invention is that, a new and advantageous type of power interconversion system employs: (1) a generator, including an electric rotor with accessory structure built on to the rotor for deflecting oncoming fluid or propelling fluid in relation to rotary movement of the rotor, and (2) a mechanism for directing the rotor to optimally use or produce fluid flow.

The same principles discussed above in relation to an integrated squirrel cage or propeller-type rotor-generator, can be applied to numerous other types of aerodynamic rotors. For example, vertical axis integrated rotor-generators can be designed and produced by integrating direct drive generator rotors with known vertical axis aerodynamic rotors such as the Savonius-type rotor disclosed and described in U.S. Pat. No. 1,766,765 and U.S. Pat. No. 4,838,757, or the Darrieus-type rotor as described in U.S. Pat. No. 1,835,018 and U.S. Pat. No. 4,449,053, each of which is hereby incorporated by reference.

Figure 10:
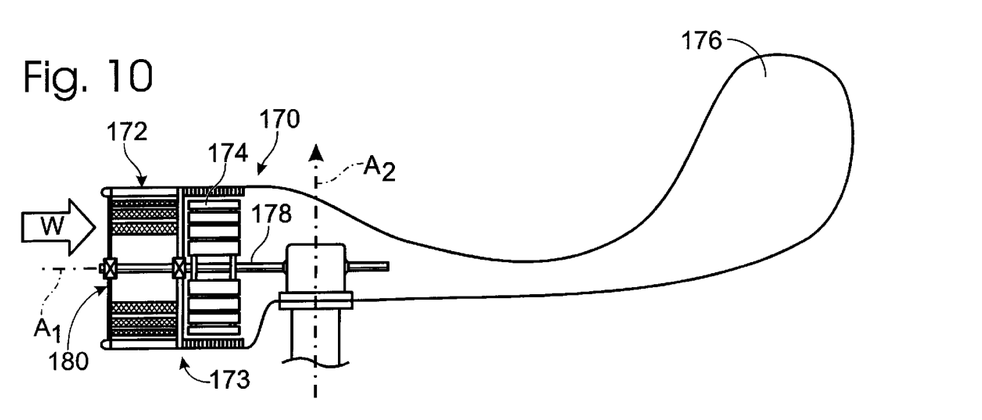
FIG. 10 is a side view of an integrated rotor-generator with a wind vane for directing the aerodynamic rotor toward oncoming wind.

A wind vane is used to align passively the rotary axis of the aerodynamic rotor with changing wind direction. FIG. 10 shows a side view of integrated rotor-generator 170 including squirrel cage aerodynamic rotor portion 172 facing wind W and integrally connected at a peripheral region 173, the rotor in to direct drive generator portion 174. Wind vane 176 extends behind integrated rotor-generator 170 and responds to changes in wind direction W by causing shaft 178 to rotate around primary support axis A2 so that wind W is optimally directed toward and into front end opening 180 of aerodynamic rotor portion 172.

Figures 11, 12:
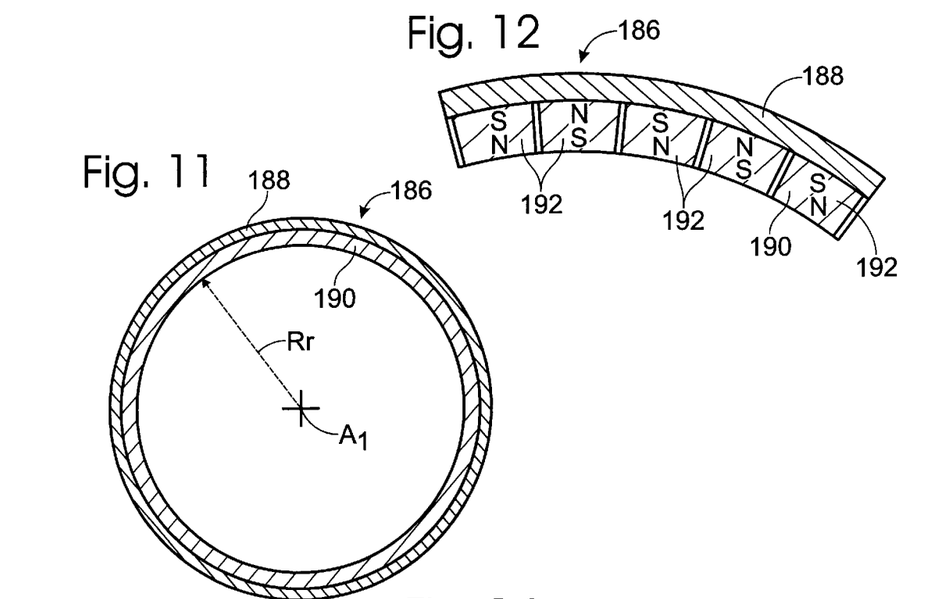
FIG. 11 is a partial sectional view of an electric rotor employed in the present invention.
FIG. 12 is an enlarged partial view of the rotor shown in FIG. 11.

FIGS. 11 and 12 illustrate a preferred construction of an electric rotor for use in a single unitary integrated rotor-generator of the present invention. As already explained, the electric rotor is directly connected to and rotates with the aerodynamic rotor as an integrated assembly. The diameters of the electric and aerodynamic rotors are substantially the same. Both the electric rotor and the aerodynamic rotor operate at or near optimal efficiency. No speed increaser is required. As shown in FIG. 11, electric rotor 186 includes a ring-like outer rim 188 made of magnetic steel for magnet support and for providing the external magnetic flux path. Inner ring 190 is bonded to outer rim 188. Inner ring 190 is comprised of spaced, permanent magnet segments with alternating N-S polarity. Rr is the inside radius of electric rotor 186. FIG. 12 is a partial enlarged view of electric rotor 186. Five magnetic poles are created by inner, spaced, magnetic segments 192.

Figures 13, 14:
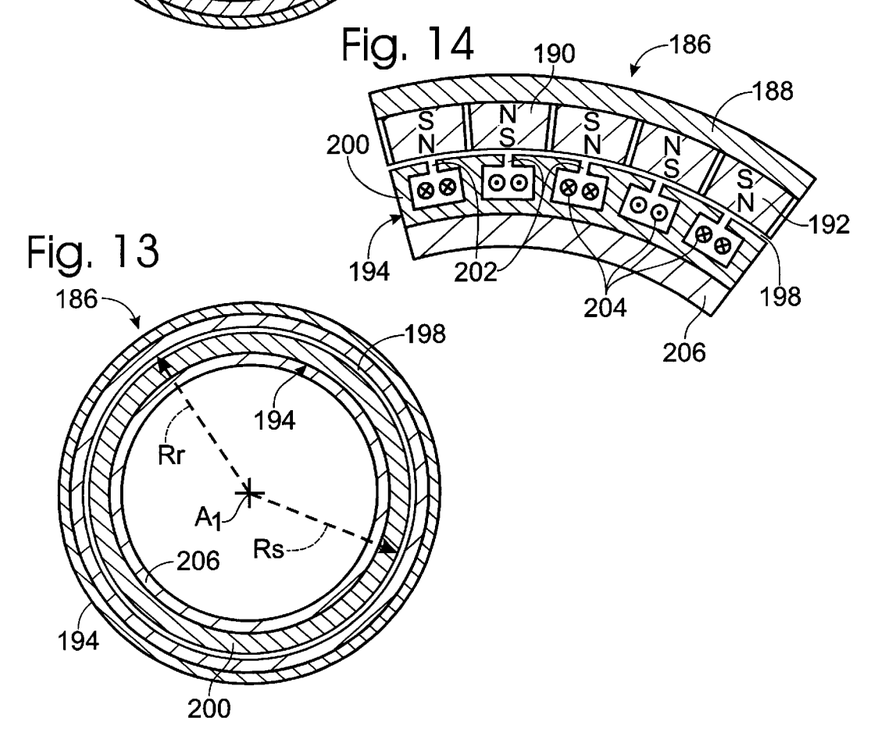
FIGS. 13 and 14 are partial sectional views of a preferred electric rotor and stator configuration employed in the present invention.

FIGS. 13 and 14 show stator 194 positioned inside electric rotor 186. Stator 194 is a non-rotating, ring-like structure situated inside rotating electric rotor 186. Electric rotor 186, located outside stator 194, carries flux-producing permanent magnets 192 and rotates with the aerodynamic rotor (not shown). Electric rotor inside radius Rr is slightly larger than stator outside radius Rs. Rr minus Rs equals the dimension of airgap 198. Thus, electric rotor 186 and stator 194 form a concentric and coaxial pair of rings with a common center.

Stator 194 includes two ring-like structures. Inner ring 200 is fabricated from laminations of magnetic steel. The laminations are fabricated with slots 202 to carry stator windings 204. Stator windings 204 are preferably fabricated from copper wire. The purpose of the stator laminations is to complete the magnetic circuit for flux originating in the spaced, oriented permanent magnets 192 of electric rotor 186. The magnetic circuit consists of the magnets 192, the rotor magnetic steel backing ("back iron") 188 which backs and supports magnets 192, and stator magnetic steel laminations 200. With respect to an adjacent pair of magnets, the magnetic flux is thus guided: (a) from a magnet north pole across air gap 198, (b) through stator laminations 200, (c) across air gap 198 to the adjacent magnet south pole, (d) through the magnet to its north pole and (e) through the rotor back iron 188 to the south pole of the originating magnet, thus completing the magnetic circuit.

As electric rotor 186 rotates, stator windings 204 experience an alternating magnetic field. This in turn induces an electromotive force in stator windings 204 that, when connected to a load, produces electric current and power. For simplicity, the stator winding configuration shown in FIG. 14 is a single-phase winding composed of two conductors in parallel. A multi-phase winding would be produced through the use of multiple slots per magnet pole. Finally, stator laminations 200 are attached to an inner mechanical support ring 206. Ring 206 is attached to support structures stemming radially down to a central shaft (not shown).

Figures 15A, 15B, 15C, 16, 17A, 17B:
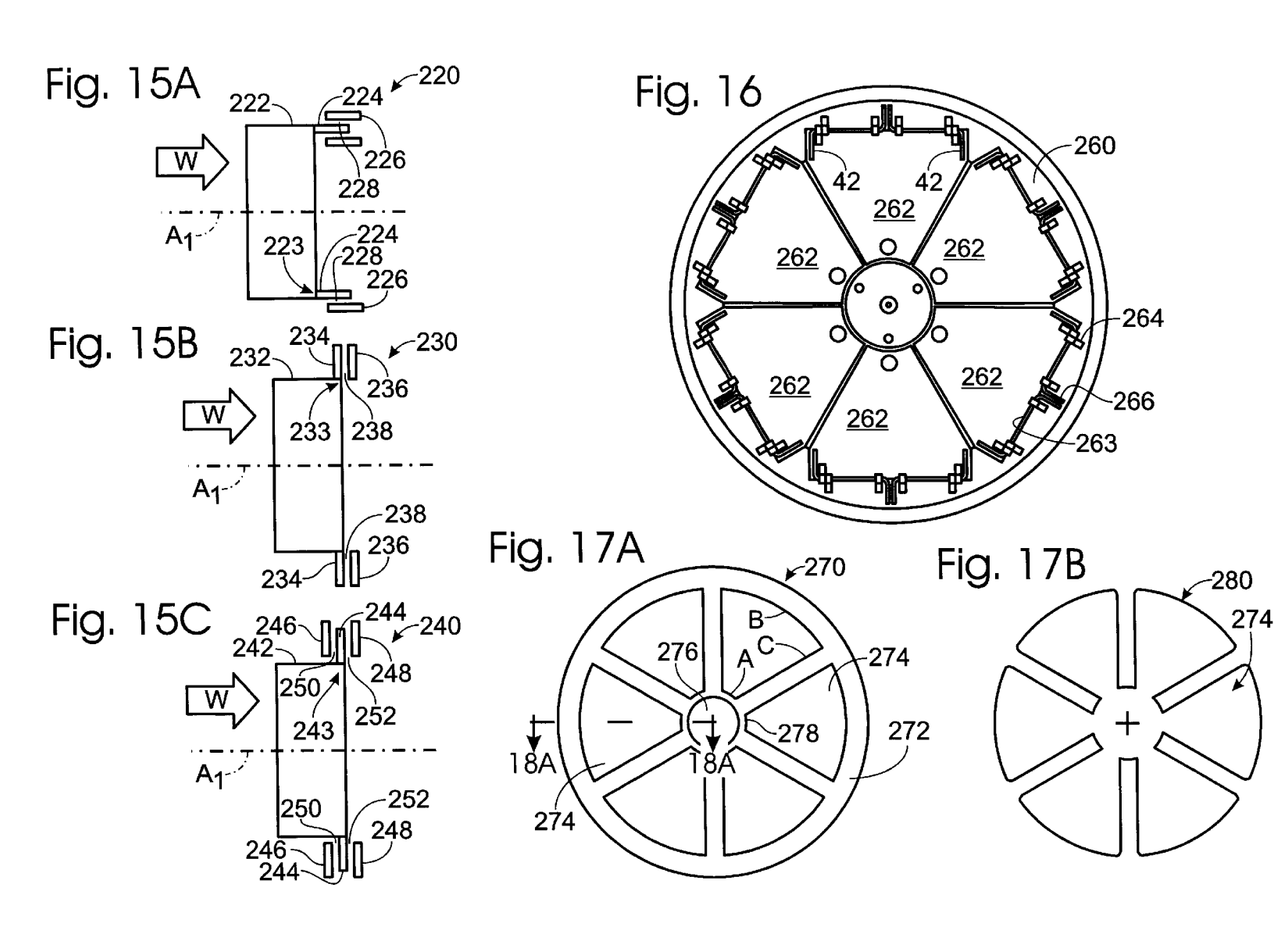
FIGS. 15A–15C are schematic side views of integrated rotor-generators employing alternative electric rotor and stator configurations in accordance with the present invention.
FIG. 16 shows a front view of a back door system employed used in a hoop-type aerodynamic rotor.
FIG. 17A is a front view of a back door system in a hoop-type aerodynamic rotor in accordance with the preferred embodiment of the present invention.
FIG. 17B is a front view of a seal-piece array of back door elements employed in the system illustrated in FIG. 17A.

FIGS. 15A–15C illustrate alternative electric rotor and stator configurations. FIG. 15A shows a cross-section through integrated rotor-generator 220. Aerodynamic rotor 222 is connected at peripheral region 223 to electric rotor 224. Stator 226 is positioned externally around the circumference of electric rotor 224, thus defining air gap 228. In operation, aerodynamic rotor 222 and electric rotor 224 rotate around rotary axis A1 as an integrated unit in response to oncoming wind W, while stator 226 remains stationary relative to rotary axis A1.

FIGS. 15B and 15C show two examples of an integrated rotor-generator employing an axial field generator. In FIG. 15B, aerodynamic rotor 232 is connected at peripheral region 233 to electric rotor 234. Stator 236 is positioned near electric rotor 234 to define air gap 238. Rotors 232 and 234 rotate around rotary axis A1 in response to wind W, while stator 236 remains stationary relative to rotaly axis A1. Similarly, in FIG. 15C aerodynamic rotor 242 is connected at peripheral region 243 to electric rotor 244. Electric rotor 244 is sandwiched between stator 246 and stator 248, thus defining gap 250 and 252, respectively. Wind W impinges on aerodynamic rotor 242, causing aerodynamic rotor 242 and electric rotor 244 to rotate around rotary axis A1, while stators 246 and 248 remain stationary relative to rotary axis A1.

FIGS. 16–25 illustrate embodiments of the invention relating to an important aspect of a hoop-type or squirrel cage aerodynamic rotor, such as the one shown in FIG. 6. Referring back to FIG. 6, wind W enters open front end 92. Wind W then encounters back panel and door assembly 97 and is redirected radially out through the periphery of rotor 90 between air foils 96, causing rotational movement of aerodynamic rotor 90 around rotary axis A1. At normal operational wind speeds, it is desirable for back panel and door assembly 97 to be mostly or totally closed. However, at extremely high wind speeds, such as hurricane-force winds, the turbine system may not be capable of withstanding such high wind forces without catastrophic consequences, for example, collapse and destruction of the rotor and its support system. Therefore, it is important to design and utilize a back door system which provides variable opening of the back panel as a function of wind force.

FIG. 16 shows a back panel and door assembly system that was disclosed in U.S. Pat. No. 5,425,619, the full disclosure of which was incorporated by reference above. Back panel 260 has six generally pie-shaped doors 262. Each door 262 has a hinging edge 263 which is near the periphery of the aerodynamic rotor. Hinging edge 263 of back door 262 is connected to back panel 260 via hinge 264. Spring 266 operates in conjunction with hinge 264 to provide resistance against opening of back door 262, so that elevated wind forces are required to open back doors 262 and the extent of opening varies??? as a function of wind force. The back panel and door assembly illustrated in FIG. 16 is considered to be a "passive" system because the doors automatically open to variable extents in direct response to changes in wind force without the need for special sensors or actuators. Springs 263 are selected to provide the appropriate degrees of back door opening as a function of wind force.

FIG. 17A illustrates another back panel and door assembly 270. Back panel 272 has a plurality of back door elements 274. Back door elements 274 are secured to back panel 272 by hub 276. Each back door element 274 hinges by bending around clamping line 278 near the center of back panel 272. It is preferable for back door element 274 to be connected to each other and formed out of a single sheet of material. For example, as shown in FIG. 17B, a single, flower-shaped, back door element 280 can be stamped out of a sheet of material such as fiberglass, metal, plastic, rubber, etc. Back door element 280 is then secured to back panel 272 by hub 276. Back panel and door assembly 270 passively responds to changes in wind force. Additionally, back panel and door assembly 270 is simple and requires a minimal number of parts. In contrast to the back door system disclosed in U.S. Pat. No. 5,425,619, back panel and door assembly 270 does not require special hinges and springs, but instead relies on the natural spring capacity of the back door material itself, and its selected dimensions.

Numerous variations of back panel and door assemblies are possible. For example, as shown in FIG. 17A, the clamping line can be changed to boundaries C or B instead of A. Also, different door elements can have different spring coefficients, i.e., different opening profiles as a function of wind force.

Figure 18A:
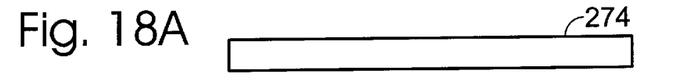
FIG. 18A shows a partial cross-sectional side view through a back door element in the system illustrated in FIG. 17A.
Figure 18B:
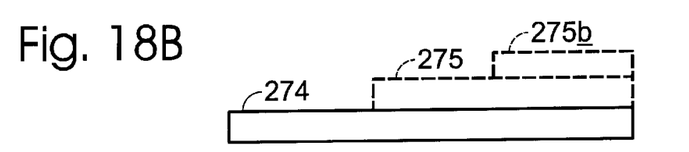
FIGS. 18B and 18C are partial cross-sectional side views of alternate back door elements to the one illustrated in FIG. 18A.
Figure 18C:
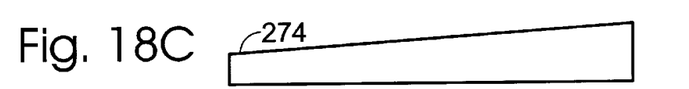

FIG. 18A shows a cross-section through back door 274. Back door 274 has a uniform thickness along its radial length. The thickness of back door 274 is selected, at least in part, to achieve the desired hinging or bending capacity in response to wind force. Alternatively, it may sometimes be advantageous to vary the flexibility of the back door along its length. As shown in FIG. 18B, stiffening layers such as 275 and 275b, may be mounted on back door 274 to vary the flexibility profile of back door 274 along its length. Stiffening layers may also be useful to dampen vibration of the back door system. Flexibility of back door 274 along its length can also be achieved by graduating the thickness of the back door, as shown in FIG. 18C.

Figure 19:
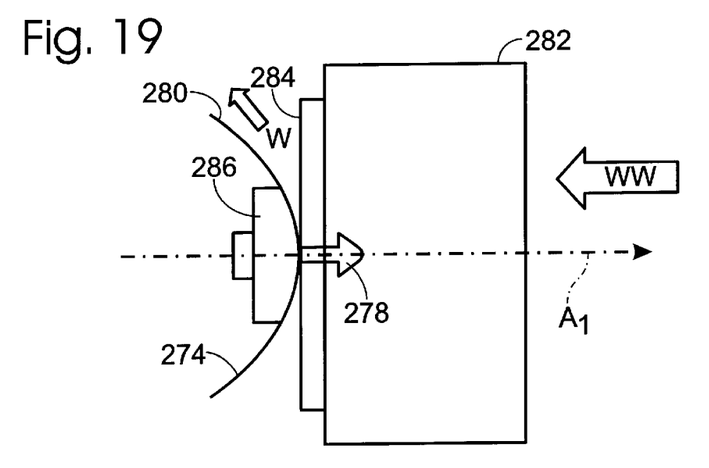
FIG. 19 is a side view of the back door system illustrated in FIG. 17A, reacting to wind force.

FIG. 19 is a cross-sectional view of back door element sheet 280 mounted on an aerodynamic rotor 282. Back door element sheet 280 is secured to back panel 284 between hub 278 on the front side, and convex washer 286 on the back side. Washer 286 controls to some extent the deflection and degree of curvature of back door element sheet 274 in high winds. In operation, at low wind speeds, back doors 274 remain substantially in the plane of back panel 284. At high wind speeds WW, which otherwise may cause catastrophic results to the turbine, back door element sheet 274 deflects backwards allowing some portion of wind W to escape through the back of the aerodynamic rotor.

In addition to avoiding mechanical damage and failure in high winds, the wind-sensitive back door assembly also can be used and tuned to reduce fluctuation in turbine rotary speed due to changing wind speed. This can have the positive result of decreasing in the otherwise inherent variability of voltage and frequency out-put from the electric generator.

Figure 20:
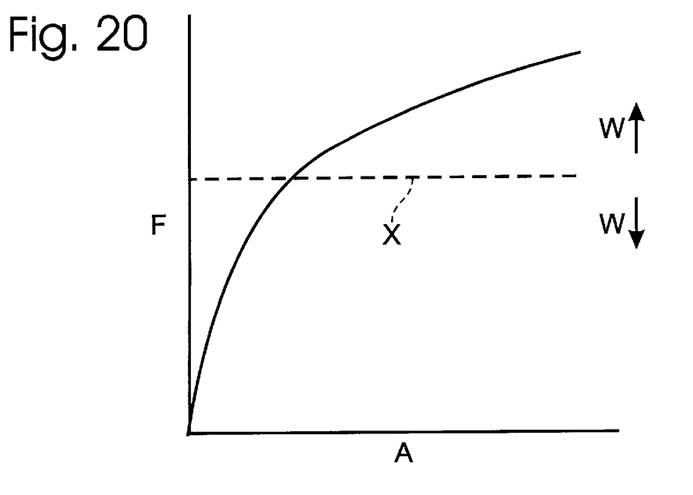
FIG. 20 is a graph showing the relationship between the extent of back door opening as a function of wind force.

FIG. 20 shows a graph plotting a back door opening area (A) as a function of wind force (F). The graph shows that, in a low wind regime, changes in wind force cause relatively small changes in the degree of back door opening. However, in a high wind regime above threshold X, relatively small changes in wind force cause large changes in the degree of back door opening (A).

Figure 21A:
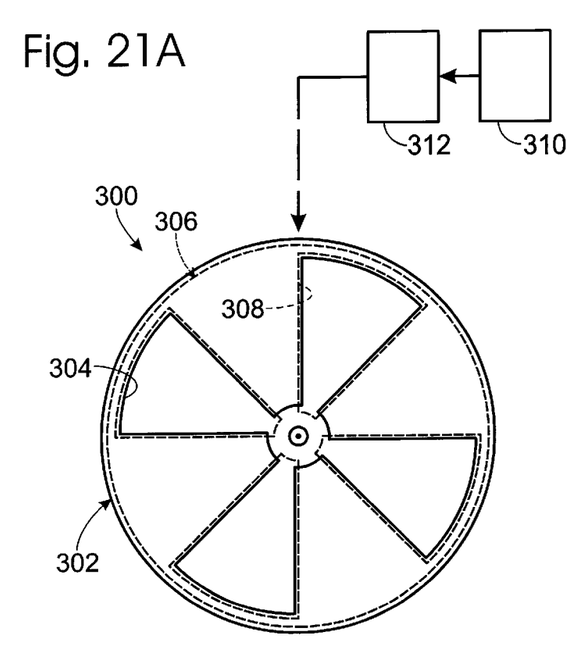
FIG. 21A is a front view of a back door system employing sliding screens in accordance with alternative embodiments of the present invention.
Figure 21B:
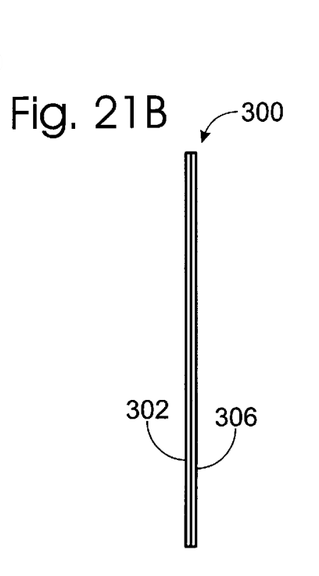
FIG. 21B is a side view of the back door system shown in FIG. 21A.

FIGS. 21A through 23B illustrate another type of back door system for a hoop-type aerodynamic rotor, employing a sliding screen arrangement. As shown in FIG. 21A, back door assembly 300 employs two sliding screens, front screen 302 defining four openings 304, and back screen 306 (dashed lines) defining openings 308. Openings 308 in back screen 306 are slightly larger than openings 304 in front panel 302. Wind sensor 310 detects wind force and transmits wind force data to actuator 312. Actuator 312 determines and then effects the desired degree or extent of back door opening by causing rotation of either screen 302 or back screen 306 relative to each other. In FIG. 21A maximum back door opening is achieved by aligning openings 304 of front screen 302 with openings 308 of back screen 306. FIG. 21B is a side view of front screen 302 and back screen 306 of back door system 300.

Figure 22A:
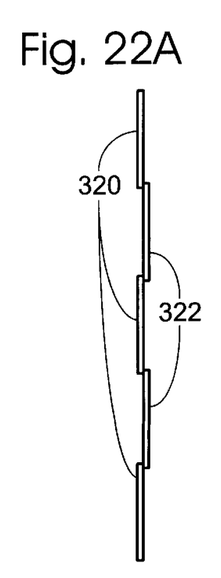
FIGS. 22A and 22B are schematic views of a two layer sliding-screen back door system in the close and open positions, respectively.
Figure 22B:
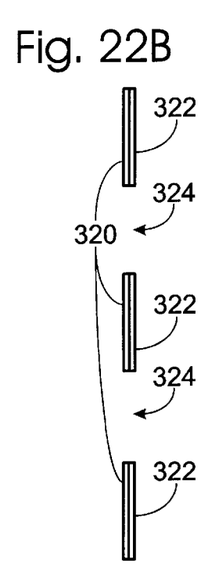
Figure 23A:
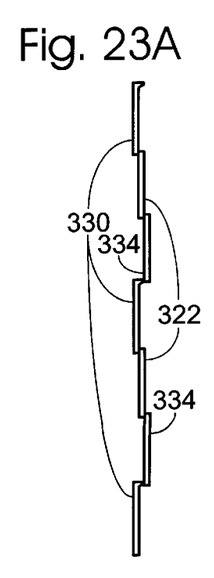
FIGS. 23A and 23B are schematic views of a three layer sliding-screen back door system in the close and open positions, respectively.
Figure 23B:
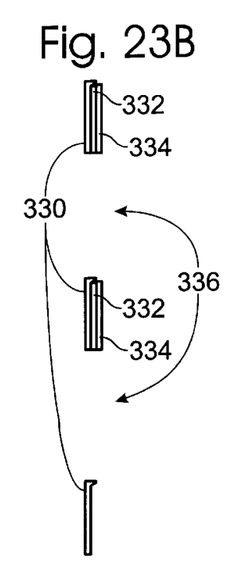

FIGS. 22A–23B illustrate schematically open and close positions of sliding screens relative to each other in a variable aperture back door system for a hoop-type aerodynamic rotor. In FIG. 22A front screen 320 is adjusted relative to back screen 322 so that all back door apertures are closed. In contrast, FIG. 22B shows the same front screen 320 and back screen 322, however, with the screens rotated relative to each other to maximally open back door apertures 324. FIGS. 23A and 23B show a three screen sliding back door system which permits a greater extent of total back door opening in the fully open position. In FIG. 23A front screen 330, middle screen 332 and back screen 334 are rotated relative to each other so that the back door apertures are closed. The same screens are shown in the maximally open position in FIG. 23B where front screen 330, middle screen 332 and back screen 334 are lined up with each other in order to maximize the area of openings 336. FIGS. 22A–22B illustrate the point that increasing the number of sliding screens allows a greater maximum extent of back door opening.

Figure 24:
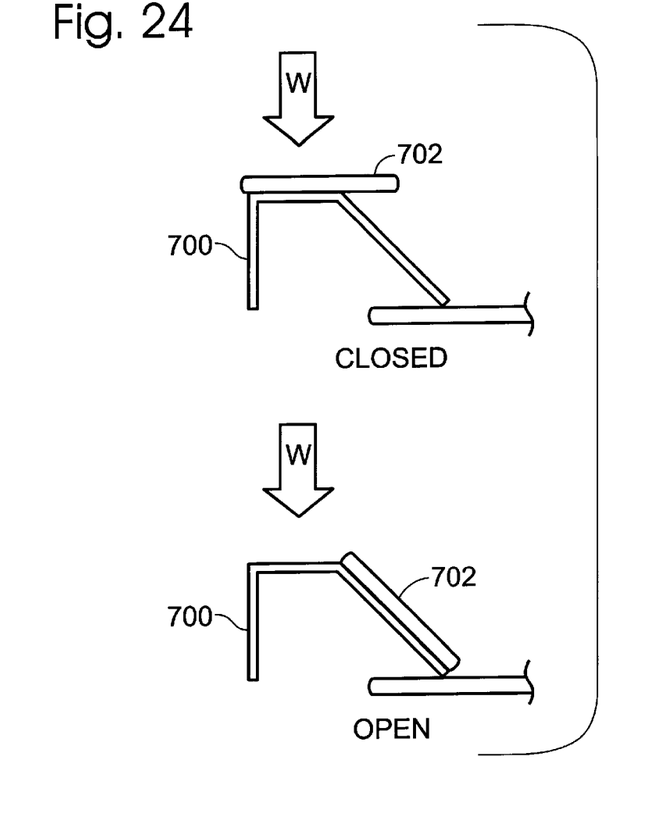
FIG. 24 is a partial cross-sectional view of a passive sliding-screen back door system according to an alternative embodiment of the present invention.

It is also possible to configure a sliding screen variable aperture back door assembly which reacts passively to wind forces. As shown in FIG. 24, a spring biased cam-shaped element 700 is used to promote rotation of a front screen 702 in response to oncoming wind force W.

Figure 25:
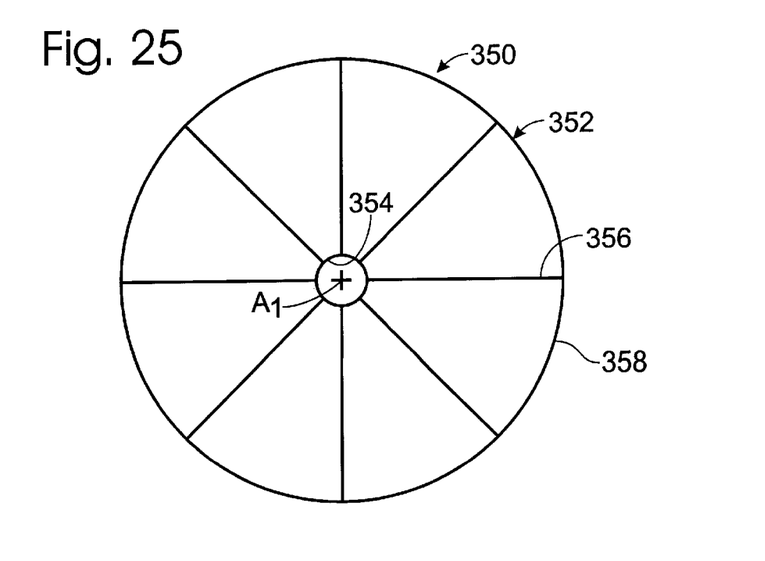
FIG. 25 is a front view of another back door system used in a hoop-type aerodynamic rotor in accordance with the present invention.

Another type of back door system is illustrated in FIG. 25. Back door system 350 is comprised of an elastomeric sheet material 352 having a small central opening 354 and radial slits 356. Elastomeric sheet material 352 is clamped near its peripheral edge 358. Wind impinging on back door system 350 causes individual segments of elastomeric sheet material 352 to bend and deform backward out of their resting-plane, collectively causing an effective increase in the central aperture dimension to release variably excessive wind power.

The invention which has been exemplified above in the context of wind turbines, has many other applications. The integrated rotor-generator may be employed advantageously in all sizes and power ratings of electricity-generating wind turbines. Additionally, the invention may be viewed more generally as useful for converting fluid flow to mechanical rotation and electrical power. For example, the integrated rotor-generator can be applied to underwater or other liquid applications. The invention may also be applied inversely to the wind turbine example, i.e., the conversion of electrical power to fluid flow power, such as in electrically-driven fans for moving fluids.

The invention can be described as follows:

A system for converting fluid-flow power to electrical power comprising an elongate, generally squirrel-cage-like, rotary spool journaled for rotation on and about the long axis of a central, stationary support shaft, or the like, said spool including a fluid-dynamic foil assembly which is located on, and which generally defines, one perimetral end of said spool, and an electromagnetic generator rotor which is located on, and which generally defines, the opposite perimetral end of the spool, and an electromagnetic generator stator extending into said spool's said opposite end, magnetically and operatively coupled to said rotor.

A wind-power-deriving, electrical power generator comprising a wind-responsive revolution structure defining a passage for the through-flow of wind, said revolution structure including aerodynamic vanes at least partially forming said passage located at one spatial region on said structure for responding to such a through-flow to effect mechanical rotation of the revolution structure, and an electromagnetic generator rotor located at another spatial region on the revolution structure, and also at least partially forming said passage, and an electromagnetic generator stator positioned operatively adjacent, and magnetically coupled to, said electromagnetic generator rotor.

A system for converting wind power to electrical power comprising an elongate revolution structure having a long axis which is also its rotational axis, and which is mounted for rotation on and about said rotational axis, said revolution structure including an elongate, generally annular, cylindrical wall, one end of which is formed with an aerodynamic air-foil assembly for responding to wind flow directed substantially along said long axis to produce rotation of the revolution structure, and an electromagnetic generator rotor forming the opposite end of said wall, and an electromagnetic generator stator operatively and magnetically coupled to said rotor adjacent said opposite end of said wall.

A direct-drive system for converting wind power to electrical power comprising a wind-power-responsive unit including an aerodynamic rotor which rotates under the influence of wind power, and an electrical-power-generating assembly including a rotor directly coupled to the rotor in said wind-power-responsive unit, operable, at the same rotational speed as said wind-power-responsive unit's said rotor, for converting such rotation to electrical power.

A system for converting wind power to electrical power comprising a wind-power-responsive unit including a generally annular and hollow, cylindrical, aerodynamic rotor having perimetral rim structure which rotates under the influence of wind power, and an electrical-power-generating assembly including a generally annular and hollow, cylindrical rotor including perimetral rim structure drivingly connected, in a rim-to-rim manner, with the rim structure in said wind-power-responsive unit's rotor for rotation on a one-to-one basis with, and at the same rotational speed as, said latter-mentioned rotor and for converting such rotation to electrical power.

A system for converting wind power to electrical power comprising a wind-power-responsive unit including a rotor which has a generally annular and hollow, cylindrical configuration and which includes, essentially as its sole means for extracting power from a flow of wind, aerodynamic surface structure which is located adjacent the perimeter of the rotor, whereby extracted wind power is extracted and collected essentially about 100% by and in said surface structure, and an electrical-power-generating assembly including a generally cylindrical, annular and hollow rotor having rim structure drivingly connected to said first-mentioned rotor's perimeter, into which rim structure power collected by and in said surface structure is delivered directly to produce one-to-one powered rotation of the electrical-power-generating assembly's rotor, thus to effect the creation of electrical power.

The system which further comprises power electronics control structure having an input side operatively connected to said electrical-power-generating assembly, and an output side, said control structure operating in such a manner that electrical conditions existing at its output side are entirely dependent on electrical conditions existing at its input side, and electrical conditions present at its input side are entirely in-dependent from electrical conditions existing at its output side.

An apparatus for generating electrical power from wind power comprising a hoop-shaped aerodynamic rotor, and a direct-drive generator coupled to the rotor.

The system, wherein said generator has an electric generator rotor which is directly connected to, and turns with, the aerodynamic rotor.

The system, wherein said generator has an electric generator stator contained substantially inside the electric generator rotor and which remains stationary when the aerodynamic rotor and the electric generator rotor rotate.

The system which further comprises power electronic control structure connected to the generator.

The system, wherein said control structure includes an input side connected to said generator, and an output side, said control structure operating in such a manner that electrical conditions existing at its output side are entirely dependent on electrical conditions existing at its input side, and electrical conditions present at its input side are entirely in-dependent from electrical conditions existing at its output side.

The system, wherein said further comprising a wind vane connected to the aerodynamic rotor, the aerodynamic rotor having an open end and being free to rotate about a central rotor axis which is maintained in a substantially parallel orientation relative to the direction of wind flow, the aerodynamic rotor being supported by a shaft in line with the central rotor axis, wherein the shaft is supported by a primary support structure defining a generally vertical support axis, the shaft being free to rotate around the support axis, so that the wind vane causes the shaft and aerodynamic rotor to rotate around the support axis according to wind direction, thereby allowing wind to be optimally received through the open end of the aerodynamic rotor.

The system, wherein said aerodynamic rotor has sixteen air foils.

A system for generating electrical power from wind power comprising an aerodynamic rotor which is rotatable around a central rotational axis, a support structure including a shaft having a core, in line with said rotational axis, for supporting the rotor, the aerodynamic rotor being free to rotate around the rotational axis while the shaft remains stationary relative to that axis, and a direct-drive generator including an electric rotor connected to the aerodynamic rotor, so that wind impinging the aerodynamic rotor causes the aerodynamic rotor and the electric rotor to rotate around the rotational axis at the same speed while the shaft remains stationary relative to the rotational axis.

The system which further comprises power electronic control structure having an input side operatively connected to said generator, and an output side, said control structure operating in such a manner that electrical conditions existing at its output side are entirely dependent on electrical conditions existing at its input side, and electrical conditions present at its input side are entirely in-dependent from electrical conditions existing at its output side.

The system, wherein said aerodynamic rotor is hoop-shaped.

An apparatus for generating electrical power from wind power comprising a substantially barrel-shaped power-conversion device having a substantially open front end for receiving wind, and a back end, the device being rotatable around a central rotational axis adaptably oriented in the direction of wind travel, wherein the device includes an aerodynamic rotor section adjacent the open front end of the device, and a direct-drive generator section adjacent the back end of the device, wherein the aerodynamic rotor section is substantially contiguous with the generator section, so that the entire device rotates as a single integrated unit in response to wind power directed toward and through the open front end of the device.

A system for generating electrical power from wind power comprising an aerodynamic rotor, a direct-drive generator connected to the aerodynamic rotor, wherein the generator includes an electric rotor, and acentric torque-transfer structure connecting the aerodynamic rotor to the electric rotor so that when the aerodynamic rotor rotates in response to wind power, the electric rotor rotates at substantially the same speed as the aerodynamic rotor.

The system, wherein said rotors rotate around a central rotational axis and define generally a cylindrical perimetral locus, the torque-transfer structure comprises a linkage mechanism between the aerodynamic rotor and the electric rotor located closer to the perimetral locus than to the central rotational axis.

The system, wherein the linkage mechanism is located near the locus.

A wind-responsive instrumentality operable and effective to extract power from wind and to concentrate such extracted power in the form of mechanical rotational power gathered in a zone which occupies an elongate, hollow, annular, generally cylindrical space, a mechanical-rotation-responsive instrumentality drivingly and generally annularly coupled to said first-mentioned instrumentality adjacent one end of said zone, operable to respond to mechanical rotation effected by the first-mentioned instrumentality and to convert the same into a hollow, annular, cylindrical zone of rotating magnetic power, and a rotary-magnetic-energy-responsive instrumentality magnetically and operatively coupled to said mechanical-rotation-responsive instrumentality, effective to convert a response to such a zone of rotating magnetic energy to electrical power.

The system which further comprises power electronic control structure having an input side operatively connected to said rotary-magnetic-energy-responsive instrumentality, and an output side, said control structure operating in such a manner that electrical conditions existing at its output side are entirely dependent on electrical conditions existing at its input side, and electrical conditions present at its input side are entirely in-dependent from electrical conditions existing at its output side.

Apparatus for converting fluid-flow power to electrical power comprising a fluid-dynamic rotor which produces powered mechanical rotation from the mechanical power contained in a fluid which flows past this rotor, and an electrical generator including an electrical generator rotor drivingly connected to said fluid-dynamic rotor without the presence of any intercoupling mechanical rotary shaft between the two, operable, in response to powered mechanical rotation produced by the fluid-dynamic rotor to generate electrical power.

Apparatus for converting wind power to electrical power comprising an aerodynamic rotor which produces powered mechanical rotation from the chanical power contained in wind which flows past this rotor, an electrical generator including an electrical generator rotor drivingly connected to said aerodynamic rotor, and an elongate, stationary shaft effectively supporting each of said two rotors through journal mechanism which, together with the shaft, promotes rotation of the two about a common rotational axis which is substantially coincident with the long axis of said shaft.

A method of converting mechanical power present in the flow of a fluid, such as wind, into electrical power comprising converting such flow-contained mechanical power into mechanical rotary power, and converting such mechanical rotary power, in a rotary-drive-shaftless environment and manner, into electrical power.

A method of converting mechanical power present in the flow of a fluid, such as wind, into electrical power comprising converting such flow-contained mechanical power into first stage, mechanical rotary power, with such converted-to power then being resident in a first, rotating, hollow, generally cylindrical, shell-like region, converting such mechanical rotary power into second-stage, magnetic-field power, with such second-stage converted-to power then being resident in a second, rotating, hollow, generally cylindrical, shell-like region which is substantially coextensive and coaxial with the first-mentioned shell-like region, and converting such magnetic-field power into electrical power.

Apparatus characterized by lacking any rotating, power-transmitting shaft for converting kinetic, fluid-flow power into electrical power comprising a kinetic power side which receives and converts kinetic, fluid-flow power into rotary, mechanical power, and an electrical power side operatively connected to said kinetic power side which receives and converts such rotary, mechanical power into electrical power.

The system, wherein said sides are interconnected by a unified, hollow, generally cylindrical rotary structure.

A cup-shaped apparatus for converting wind power to electrical power comprising rotary, elongate, cup-wall structure including an air-foil wall portion defining an open end in the structure, and an electrical generator rotor wall portion joined to said air-foil wall portion and extending therefrom toward the opposite end of the cup-wall structure, said cup-wall structure being supported for rotation about a generally horizontal axis which can be generally aligned with the direction of oncoming wind, and end-wall electrical generator stator structure located toward said opposite end of said cup-wall structure, generally defining a base for said cup-shaped apparatus, operable in response to activity of said electrical generator rotor wall portion to cooperate therewith in the generation of electrical power, and mechanism supporting said cup-wall structure for follow-orienting of said structure, whereby said generally horizontal axis is generally maintained in general alignment with wind flow, and with said open end generally facing oncoming wind.

An annular, power-hand-off, power transduction system including a generally annular, cylindrical, power-transfer zone, designed for bi-directional transduction (utilizing said zone)between fluid-flow power and electrical power, said system comprising a direction-selectable, bi-directional fluid-flow port for the selective inputting and outputting of fluid-flow power, effective and operable for the conversion of such power to and from rotary mechanical power, a direction-selectable, bi-directional electrical port for the selective inputting and outputting of electrical power, effective and operable for the conversion of such power to and from rotary mechanical power, and a mechanical-power transfer structure occupying said power-transfer zone and operatively interposed said ports, operable to transfer rotary mechanical power, bi-directionally through said zone and between said ports, said system operating without the requirement for, or the presence of, a rotary shaft.

A system which is operable selectively in two, different, bi-directional modes for the conversion and translation of wind power to electrical power, and vice versa, and where such conversion occurs in a rotary, hollow, annular and cylindrical zone in the system, and via the intermediary of rotating mechanical power, said system having what can be thought of as a wind-power side and a electrical-power side, each of which sides, depending on the selected operating mode of the system, may be either the input side or the output side in the system, selection of one of these power-designated sides to be the input side automatically causing the other power-designated side to be the output side, and comprising an aerodynamic rotor on said wind-power side, including annularly and cylindrically distributed air-foil vanes, an electrical generator on said electrical side, including an electrical generator stator, and an annular cylindrical, electrical generator rotor which is drivingly connected to said aerodynamic rotor, and an elongate, stationary shaft effectively supporting each of said two rotors through journal mechanism which, together with the shaft, promotes rotation of the two rotors about a common rotational axis, which axis is substantially coincident with the long axis of said shaft.

I claim:

1. A system for converting wind power to electrical power comprising an elongate, unitary revolution structure having a long axis, a rotational axis which is coincident with said long axis, and a peripheral region which is spaced from said long and rotational axes, said revolution structure being rotatable about said rotational axis in response to incident wind, and including, adjacent one end thereof, a rotary, aerodynamic air-foil assembly for responding directly to incident wind to produce such rotation, and adjacent the other end thereof, an axially offset electromagnetic generator rotor joined generally within the mentioned peripheral region to said air-foil assembly for rotation as a unit with the same, operable, in response to rotation produced by said air-foil assembly, to effect the generation of electrical power.

2. The system of claim 1 which further comprises power electronic control structure having an input side operatively connected to said generator assembly, and output side, said control structure operating in a manner that electrical conditions existing at its output side are entirely dependent on electrical conditions existing at its input side, and electrical conditions present at its input side are entirely in-dependent from electrical conditions existing at its output side.

3. The system of claim 1, wherein said revolution structure further includes a change-configuration, wind-barrier structure generally occupying a plane intermediate said air-foil assembly and said rotor and generally normal to said rotational axis, changeable, effectively in response to incident wind velocity, to modify its configuration in such a manner that it presents, to such incident wind, more of a barrier to the through-flow of wind (relative to the wind-barrier structure) under circumstances with relatively low wind velocities than it does under circumstances with relatively higher wind velocities.

4. The system of claim 3, wherein said wind-barrier structure has a generally circular, disc-shaped member with angularly distributed openings which are distributed around said rotational axis, and change-position door structure including, for each said opening, a door expanse operatively connected to said disc-shaped member, each said door expanse being adjustable between one position generally closing its respective, associated opening, and another position more greatly exposing that opening for the through-flow of wind.

5. The system of claim 4, wherein each said door expanse is infinitely adjustable between its said one and its said other positions.

6. The system of claim 5, wherein said wind-barrier structure further includes cam structure operatively interposed said disc-shaped member and said door structure, said cam structure functioning to effect adjustment of said door expanses automatically in response to changes in wind velocity as experienced by said expanses.

7. The system of claim 5, wherein each said door expanse is adjustable by swinging toward and away from the plane generally occupied by said wind-barrier structure.

8. The system of claim 7, wherein each said door expanse is integral with said disc-shaped member, joining the same via a living hinge.

9. The system of claim 5, wherein said door expanses are adjustable by shifting angularly generally in a plane substantially paralleling the plane of the wind-barrier structure.

10. A system for converting wind power to electrical power comprising a rotary, aerodynamic air-foil assembly having a rotational axis and a peripheral region which is spaced from said axis, said assembly being directly and rotationally responsive to incident wind, and an electromagnetic generator assembly including (a) a rotor having a peripheral region which is spaced from said axis, and joined through that region to the peripheral region in said air-foil assembly for rotation as a unit with the same about said rotational axis, said rotor being directly driveable in rotation by the air-foil assembly, through the region of peripheral joinder between the assembly and the rotor, and in the presence of incident wind, and (b) an electromagnetic generator stator operatively connected magnetically to said rotor for coacting with the same to produce electrical power when the air-foil assembly rotates.

11. The system of claim 10 which further includes a rotary, change-configuration, wind-barrier structure operatively connected to said air-foil assembly and to said rotor, and generally occupying a plane intermediate the two which plane is generally normal to said rotational axis, said wind-barrier structure being changeable, effectively in response to incident wind velocity, to modify its configuration in such a manner that it presents to such incident wind more of a barrier to the through-flow of wind (relative to the wind-barrier structure) under circumstances with relatively low wind velocities than it does under circumstances with relatively high wind velocities.

12. The system of claim 11, wherein said wind-barrier structure has a generally circular, disc-shaped member with angularly distributed openings which are distributed around said rotational axis, and change-position door structure including, for each said opening, a door expanse operatively connected to said disc-shaped member, each said door expanse being adjustable between one position generally closing its respective, associated opening, and another position more greatly exposing that opening for the through-flow of wind.

13. The system of claim 12, wherein each said door expanse is infinitely adjustable between its said one and its said other positions.

14. The system of claim 13, wherein said wind-barrier structure further includes cam structure operatively interposed said disc-shaped member and said door structure, said cam structure functioning to effect adjustment of said door expanses automatically in response to changes in wind velocity as experienced by said expanses.

15. The system of claim 13, wherein each said door expanse is adjustable by swinging toward and away from the plane generally occupied by said wind-barrier structure.

16. The system of claim 15, wherein each said door expanse is hinged to said disc-shaped member through hinge structure which is more closely adjacent said rotational axis than is the periphery of the disc-shaped member.

17. The system of claim 16, wherein each said door expanse is integral with said disc-shaped member, joining the same via a living hinge.

18. The system of claim 17, wherein said door expanses are adjustable by shifting angularly generally in a plane substantially paralleling the plane of the wind-barrier structure.

19. A system for converting fluid-flow power to electrical power comprising a fluid-responsive assembly responsive to fluid flow to produce rotation about a defined rotational axis, and having a peripheral region which is spaced from said axis, an electromagnetic generator rotor supported for rotation about the same axis, and also including a peripheral region that is spaced from said axis, with said rotor being drivingly connected to and as a unit with said fluid-responsive assembly generally at said peripheral regions, and an electromagnetic generator stator operatively connected to said rotor, and coacting cooperatively with the rotor to produce electrical power on rotation of the rotor.

20. The system of claim 19 which further comprises power electronics control structure having an input side operatively connected to said electromagnetic generator stator, and an output side, said control structure operating in such a manner that electrical conditions existing at its output side are entirely dependent on electrical conditions existing at its input side, and electrical conditions present at its input side are entirely independent from electrical conditions existing at its output side.

21. A system for converting wind power to electrical power comprising an elongate, unitary revolution structure having a long axis, a rotational axis which is coincident with said long axis, and a peripheral region which is spaced from said long and rotational axes, said revolution structure being rotatable about said rotational axis in response to incident wind, and including, adjacent one end thereof, a rotary, aerodynamic air-foil assembly structured with air foils that freely accommodate both axial, and omnidirectionally radial, air-flow, and designed for responding directly to incident wind to produce such rotation, and adjacent the other end thereof, an axially offset electromagnetic generator rotor joined generally within the mentioned peripheral region to said air-foil assembly for rotation as a unit with the same about said rotational axis which is common both to said assembly and to said rotor, operable, in response to rotation produced by said air-foil assembly, to effect the generation of electrical power.

22. A system for converting wind power to electrical power comprising an elongate, unitary revolution structure having a long axis, a rotational axis which is coincident with said long axis, and a peripheral region which is spaced from said long and rotational axes, said revolution structure being rotatable about said rotational axis in response to incident wind, and including, adjacent one end thereof, a rotary, aerodynamic air-foil assembly having inner and outer sides, and structured with air foils that freely accommodate both axial, and omnidirectionally radial, air-flow, designed for responding directly to incident wind to produce such rotation, and adjacent the other end thereof, an axially offset electromagnetic generator rotor joined generally within the mentioned peripheral region to said air-foil assembly for rotation as a unit with the same about said rotational axis which is common both to said assembly and to said rotor, operable, in response to rotation produced by said air-foil assembly, to effect the generation of electrical power, and elongate, stationary, axially central support structure extending axially centrally into said revolution structure in a manner which, relative to the outer side of said air-foil assembly, is non-occluding regarding the mentioned accommodation of omnidirectional, radial air flow, and therein centrally supporting said revolution structure for rotation about said rotational axis.

\* \* \* \* \*